(12) United States Patent  
Moore et al.

(10) Patent No.: US 7,088,805 B1  
(45) Date of Patent: Aug. 8, 2006

(54) METHOD FOR POLLING A CALL LOG

(75) Inventors: Darryl C. Moore, Conyers, GA (US); Xiaofeng Gao, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 411 days.

(21) Appl. No.: 10/252,370

(22) Filed: Sep. 24, 2002

(51) Int. Cl.  
*H04M 15/00* (2006.01)

(52) U.S. Cl. .................. 379/121.05; 379/126

(58) Field of Classification Search .......... 379/142.01, 379/142.05, 142.06, 142.17, 88.21, 93.23, 379/121.05, 126; 455/412.2, 414.1  
See application file for complete search history.

(56) References Cited

U.S. PATENT DOCUMENTS

| | | | | |
|---|---|---|---|---|
| 5,499,289 | A * | 3/1996 | Bruno et al. ........... | 379/266.07 |
| 6,094,573 | A * | 7/2000 | Heinonen et al. ........ | 455/412.1 |
| 6,282,275 | B1 * | 8/2001 | Gurbani et al. ......... | 379/142.06 |
| 6,353,611 | B1 | 3/2002 | Norris et al. ............... | 370/356 |
| 6,430,598 | B1 * | 8/2002 | Dorrance et al. ........... | 709/203 |
| 6,560,456 | B1 * | 5/2003 | Lohtia et al. ............... | 455/445 |
| 2002/0052196 | A1 * | 5/2002 | Padawer et al. ............ | 455/414 |
| 2003/0185365 | A1 * | 10/2003 | Mansfield .............. | 379/142.01 |
| 2004/0203579 | A1 * | 10/2004 | Comp ........................ | 455/406 |
| 2004/0248560 | A1 * | 12/2004 | Bedingfield et al. ..... | 455/412.2 |

* cited by examiner

*Primary Examiner*—Barry Taylor  
(74) *Attorney, Agent, or Firm*—Merchant & Gould

(57) ABSTRACT

A method for remotely polling and accessing the contents of calls logs across a telephone network is disclosed. The call logs contain information about all of the phone calls placed across the telephone network and are stored in network accessible databases that are located either internal or external to the network. A subscriber using a computer or phone in communication with the network can contact the network and request the contents of one or more of these call logs. The network processes the request and delivers the call log contents to the subscriber.

20 Claims, 2 Drawing Sheets

METHOD FOR POLLING A CALL LOG

FIELD OF THE INVENTION

The present invention relates to telephone networks and in particular to methods for accessing phone call logs placed across the telephone network.

BACKGROUND

Modern phone networks provide for the identification and logging of phone calls made across the network. The information available about these phone calls includes the date and time of the call, the duration of the call, the dialed number and the number placing the call, and the names and addresses of the persons or businesses associated with these numbers. This information can be logged in a personal computer, a private branch exchange (PBX), Centrex equipment, or a database connected to a network such as a service provider network or a TCP/IP type computer network. Most of this information is typically not made available to the general public but is used for the purposes of Call Detail Reporting, to monitor phone usage, and to provide for customer billing.

Some of such information, for example the number originating the phone call, can be displayed at the dialed number on the Customer Premises Equipment (CPE). The CPE displays the number placing the call and logs a record of that number locally along with the date and time of that call. Some services may also display the name of the subscriber assigned to the originating number. Personal computers connected to services such as Asynchronous Digital Subscriber Lines (ASDL) can also create logs of received calls that are resident locally in these computers. In either example, however, a person must be at the CPE or personal computer to view these received call logs and must manually re-enter the originating numbers to return missed calls or to save the contents of the call log.

Cellular phones also provide for the display of incoming phone numbers and for logging these numbers locally including when the receiving party misses the call. Cellular phones further provide for dialing of the received phone numbers without the need to re-enter these numbers and for the direct entry of these numbers into a phone book that is resident in the cellular phone. Again, however, the user of the cellular phone must be in physical contact with that phone to take advantage of these features.

Remote access to phone messages is generally limited to voice recording answering machines that are either resident at a subscriber's premises or resident in the service provider's network and made available to subscribers. These devices and services only provide audio message from callers that leave message. In addition, unless the voice messaging system adds header information to the message such as the phone number placing the call, the information available to the recipient is limited to the contents of the audio message. In either case, the recipient receives no information if the calling party terminates the call before leaving an audio message.

Therefore, a method is desired to provide remote polling by a subscriber of a call log that contains a complete list of all originated calls to a specified subscriber number. The customer should be able to upload the information to CPE, computers, or wireless devices for review, storage and use.

SUMMARY OF THE INVENTION

The present invention is directed to a method of remotely polling the contents of call logs stored in databases that are located either internal or external to a Service Provider Network (SPN). The call logs store information about phone calls placed across the SPN including the identification of the originating phone number and the phone number that was called. This information is stored regardless of whether or not the phone calls were actually connected or were merely attempted.

According to the method, a subscriber using a device in communication with the SPN, remotely contacts the SPN and requests the contents of one or more call logs stored in the databases. The SPN checks the availability of the databases and whether or not the subscriber has access to the call log. Once access is verified, the SPN locates the databases containing the requested call logs, obtains the call logs, extracts the necessary information from the call logs and delivers this information to the subscriber. The subscriber can then review, delete, store, or contact the phone numbers identified on the call log.

The method of the present invention provides the unexpected results and advantages of allowing remote access to a log of all calls to a subscriber number including calls that were merely attempted but not connected. Any subscriber can access the call log from any other device connected to the SPN and does not have to be at the location of the subscriber number for which the call log is desired.

DETAILED DESCRIPTION

A method according to the present invention can be used to remotely poll and download the contents of call logs stored in databases that are located both internally and externally to telephone networks or Service Provider Networks (SPN) including wireless networks and wireline networks such as Publicly Switched Telephone Networks (PSTN). The calling logs can be polled by a subscriber within the subscriber's own SPN or across other SPNs.

Figure 1:
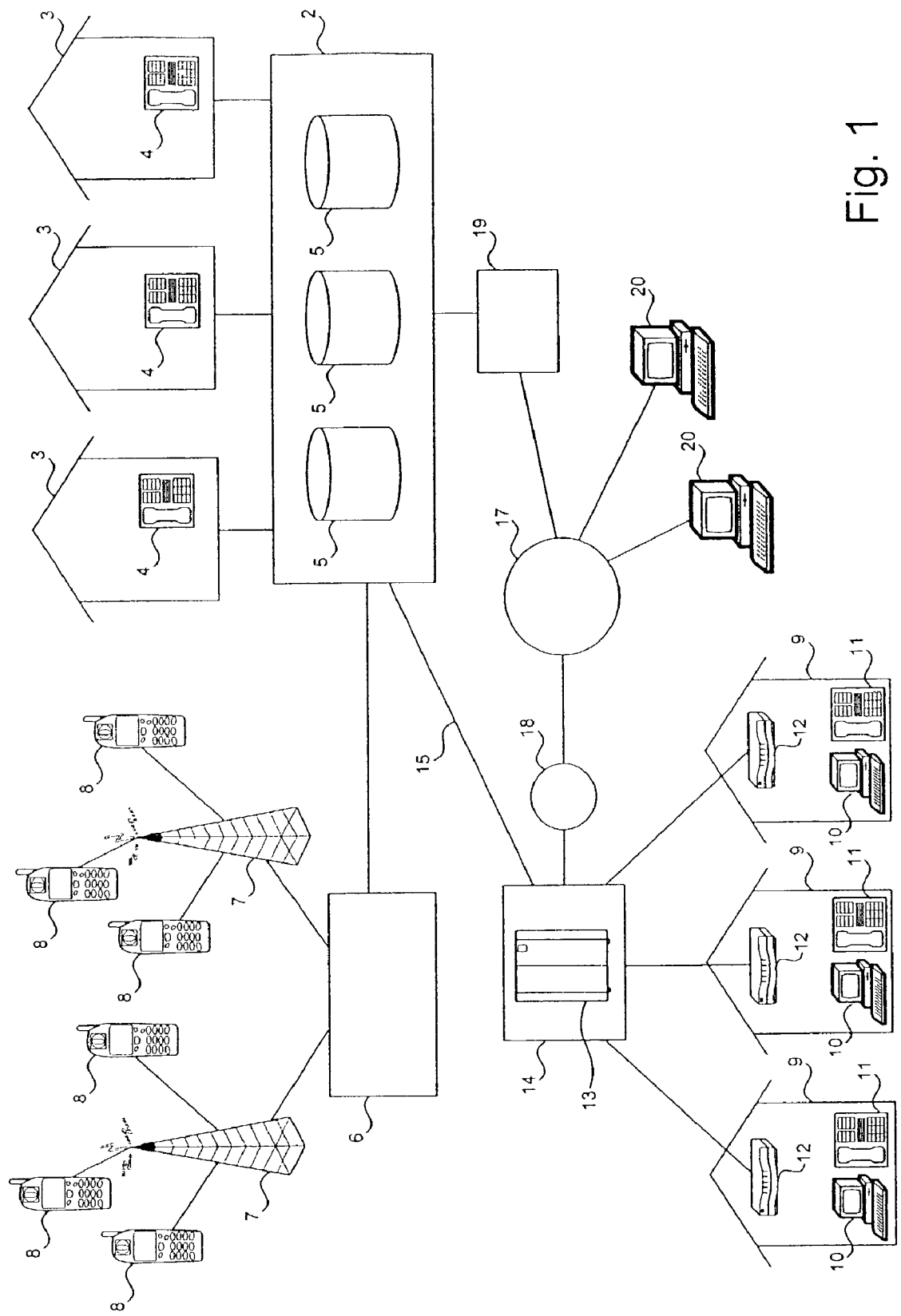
FIG. 1 is a schematic of one embodiment of a subscriber and service provider network configuration for use with a method of the present invention.

Referring initially to FIG. 1, an example of a network configuration 1 for use with an embodiment of the present invention is illustrated. The SPN 2, for example a PSTN, is provided and may include a plurality of wireline subscribers 3. Each wireline subscriber 3 includes Customer Premises Equipment (CPE) 4 such as a telephones, answering machines, telefacsimile machines, and caller identification displays. The SPN 2 also includes at least one, and preferably a plurality of, internal databases 5 for storing information necessary for the operation of the SPN 2. Suitable information includes profile information about subscribers including billing information, communication protocols, information about services to which various subscribers have subscribed and call logs.

The SPN 2 is connected to one or more wireless communication networks 6. The wireless communication network includes transmission equipment 7, such as cellular towers, for communicating with a plurality of wireless devices 8 such as, for example, cell phones, pagers and personal digital assistants (PDA). The wireless devices are in communication with the SPN 2.

The SPN 2 also includes a plurality of Digital Subscriber Line (DSL) subscribers 9, for example Asymmetrical Digital Subscriber Line (ASDL) subscribers. These subscribers have CPE that includes, for example, personal computers 10 and telephones for use as conventional phones or as IP-type phones. The DSL subscribers CPE interface with the SPN through a plurality of routers 12 or DSL line modems disposed at the subscribers' premises. The routers are connected to one or more Digital Subscriber Line Access Multiplexers (DSLAM) 13 disposed, for example, at a central office 14. Each DSL subscriber can also include one or more subscriber databases 16 for logging information locally including call logs.

The DSLAMs can be in direct communication with the SPN through a directed communication link 15. Alternatively, the DSLAMs are connected to a computer network 17, such as a wide area network including the internet or world wide web, through an Internet Service Provider (ISP) 18. The computer network is in communication with the SPN through a web portal 19. The computer network may also include a plurality of additional computers 20 directly connected to the network itself, and one or more databases (not shown) for storing information including call logs. This network configuration permits communication and data transfer among the numerous devices, networks, and subscribers using various types of equipment, methods, and protocols readily available and known in the art.

Figure 2:
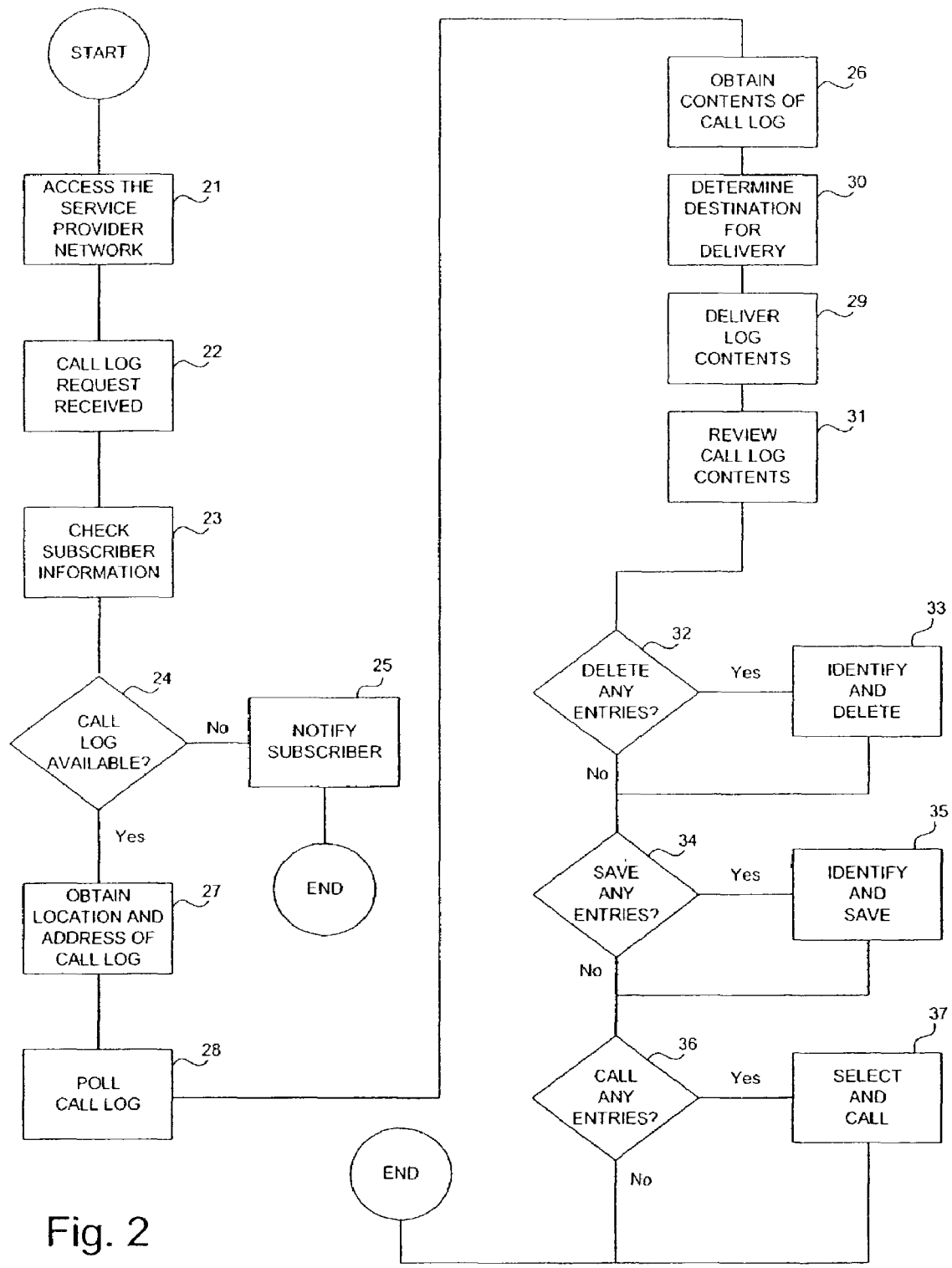
FIG. 2 is a high level flow chart illustrating an embodiment of a method of the present invention.

Referring to FIG. 2, in the embodiment of the method of the present invention shown, a subscriber wishing to obtain the contents of a call log for one or more subscriber phone numbers contained in the SPN, including wireline subscribers, DSL subscribers, and wireless subscribers, accesses the SPN 21. The subscriber can access the SPN using the subscriber's CPE as either a wireline subscriber or a DSL subscriber, through a wireless device in the wireless network, or through a computer connected to the computer network. Suitable methods to access the SPN include E-mail, internet website interfaces using, for example, windows-type environments, dedicated call-up servers, internet browsers contained in wireless devices, and telephone mailbox-type interfaces using a phone keypad.

Using the suitable devices and methods, the subscriber establishes a connection with the SPN and requests the call log for one or more subscriber numbers for which the SPN either maintains a call log or has access to a database that maintains a call log. In general, the SPN has access to at least one database that contains at least one call log storing information about the phone calls placed to subscribers across the SPN. Preferably, the SPN has access to a plurality of databases containing a plurality of call logs. The information contained in the call logs includes the phone number called, the phone number originating the calls, the time the call was placed, whether not a connection was made, the duration of the phone call and the identification of the parties and addresses of the parties that are both recipients and originators of the phone call including E-mail addresses.

The SPN receives the request 22 and processes the request from the subscriber for the contents of one or more call logs identified by the subscriber. The subscriber defines the parameters of the request, including specifying the phone numbers for which call logs are desired, the time period covered by the requested call logs, for example since the last call log request or covering the previous 24 hour period, or the originating phone numbers. In order to process the request, the SPN accesses a database for information regarding the subscriber placing the request 23. This information can be obtained from databases internal or external to the SPN. The information includes a profile of the subscriber, whether or not the subscriber has subscribed to services that make the call log available, and whether or not those services are currently active. The obtained information also includes an indication of whether or not passwords or other additional identification will be needed from the subscriber to complete the request. The SPN also checks the status of the network for system failures or maintenance that may make one or more portions of the SPN temporarily unavailable.

Based upon the information obtained and the status of the SPN, the SPN verifies the availability of the requested call logs and verifies access to the requested call logs by the subscriber, and also whether or not any additional information is needed 24. If additional identification information is needed from the subscriber, the SPN prompts the subscriber for passwords and identification numbers. Upon entry of the identification information, the SPN will process and compare the entered values with values stored in the database. If the call logs are unavailable, the subscriber does not have access to one or more of the call logs requested, or the subscriber entered incorrect identification information, the SPN will inform the subscriber that access has been denied and will terminate the connection 25. In a preferred embodiment, the subscriber is provided with an explanation as to why the connection is being terminated and call log access is being denied.

Once the SPN determines that the requested call logs are available and that the subscriber has valid access to those call logs, the SPN will then obtain at least a portion of the contents of each of the identified and available call logs 26. In order to obtain the contents, the SPN determines the location of the databases containing the requested call log. Since the call logs may be disposed in one or more databases that are internal or external to the SPN, the location information obtained by the SPN includes a computer readable address of the database containing the requested call log. The SPN then uses the location information including the address to contact the appropriate database and poll the requested call log 28. The SPN can access the databases directly, for databases internal to the SPN, over phone lines, across computer networks or across communication lines such as TCP/IP communication lines.

Since each call log may contain a large amount of information about the calls placed across the network and some of this information may be of a personal or proprietary nature, only selected parts of the call log are made available. Therefore, the SPN obtains only a portion of the call log. The SPN then delivers the obtained information to the subscriber that placed the request 29. The obtained information may be delivered directly to a wireless device, downloaded to a computer or downloaded to a wireline device such as CPE. In order to deliver the obtained information to the proper destination, the SPN determines the appropriate destination for delivery 30.

The SPN can deliver the obtained information electronically as, for example, a file containing a list in one or more file formats. In an alternative embodiment, the SPN delivers the obtained information audibly. The subscriber can listen to and scroll through the audible list using conventional methods such as the keypad on CPE. In one embodiment, delivery of the contents of the call logs does not erase the call log. In another embodiment, delivery of the contents of the call log erases the call log from the database. Preferably, the call log is maintained in the database for a predetermined period of time after delivery of the contents of the call log and is erased after this predetermined period. Once the call log is received by the subscriber, the SPN terminates the connection.

Upon delivery of the call log information, the subscriber can scroll and review the delivered contents of the call logs using conventional methods associated with phones, computers, and other electronic equipment for viewing or scrolling lists of data 31. The subscriber can ignore unimportant entries by simply by-passing the entries while scrolling the list. Alternatively, the subscriber can actively choose to ignore one or more entries from the list. To actively ignore an entry, the subscriber selects an entry and assigns the action "ignore" to that entry using conventional methods for selecting an action including keystrokes, onscreen buttons, and clicking and dragging. Actively ignoring an entry removes the entry from the subscriber's screen and then deletes the entry from the call log, preferably after a specified period of time such as 24 or 72 hours.

The subscriber can then determine if any entries are to be deleted 32 by selecting specific entries from delivered call logs and deleting those entries from the list 33. In addition, the subscriber can determine if certain entries are to be saved 34, by selecting specific entries from delivered call logs and saving or storing those entries 35. The selected entries can be saved directly to a wireless device such as a cellular phone or to a phone book associated with a personal computer or personal digital assistant. In addition, the various devices to which the entries are saved can be synchronized so that when the call log is downloaded to one device it is saved to that device then synchronized and saved to all the other devices.

The subscriber may also decide to contact one or more of the entries from the call log 36. For example, the subscriber can select a phone number from the call log and immediately call that number without having to reenter that number on the keypad of either a wireline or a wireless type communication device to which the call log is delivered 37. In an other embodiment when the call log is downloaded, for example, to a personal computer, the subscriber may respond to the originator of a phone call via the E-mail address associated with that originator using conventional methods of sending electronic mail, including hyper linking to a program that supports E-mail or cutting and pasting the displayed email address to a program that supports electronic mail type communications.

The E-mail address associated with the call originator may also be used to contact that originator using a wireless device such as a cellular phone that contains a system such as a mini-browser that provides an interface between the cellular phone and the internet. Cellular having suitable mini-browser interfaces are known and available in the art. Alternatively, the wireless communications device can be integrated into a hand-held personal digital assistant device, enabling using of E-mail addresses wireless communication. Theses devices are also known and available in the art.

The E-mail address associated with the originator can be obtained in the call log or in a separate file in a database to which the SPN has access. The SPN can then obtain that E-mail address and forward it with the call log information. Alternatively, the E-mail address of the originator is not within the call log or a database to which the SPN has access, but is found in an address book of the customer that requested the call log. This address book is accessible by that customer in formats including but not limited to OUTLOOK® commercially available from the Microsoft Corporation, Hotmail® commercially available from the Microsoft Corporation, Eudora commercially available from Software Oasis, Inc., bigfoot™ commercially available from Bigfoot Communications, InfoSpace™ commercially available from InfoSpace, Inc., and BellSouth.net™ commercially available from BellSouth Incorporated.

The requesting customer, upon receipt of the contents of the call log, uses the contents of the call log to search these address books for E-mail address associated with selected entries. The address books can be contained in databases internal to the customer's personal computer, in databases internal to the customer's cellular phone or on databases that can be accessed by the customer using the mini-browser on the cellular phone. Once located, the E-mail addresses are delivered to the customer, on either a computer or a mini-browser on the cellular phone. The personal computer can also be used to contact the originator using an IP-type phone associated with that computer.

As an example of the use of the method of the present invention, a DSL subscriber having a database connected to a personal computer wishing to access the contents of a call log resident on that database via a cellular phone containing a mini-browser and connected to a wireless network contacts the SPN through the wireless network on which the cellular phone is connected by calling the voice message mailbox associated with that cellular device. That service that provides the voice message mailbox also provides access to calling logs.

Once the subscriber is connected to the voice message mailbox, the subscriber using the keypad enters one or more key strokes associated with accessing and polling call logs. The subscriber then uses the keypad to type in the subscriber phone number for which the call log is desired, and continues by selecting key strokes to request the call log for the last 24 hours. The SPN receives this request and confirms that the call log exists and is available and that the subscriber has a valid and current subscription to a service that provides for access to this call log. The SPN then determines that the requested call log is resident at a database attached to the CPE and obtains an IP address, either a permanent or temporary IP address, assigned to that particular database. The SPN then goes through an internet portal and across the internet to access the appropriate database. Once the database is accessed, the SPN obtains the contents of the requested call log from the database, extracts the appropriate information from the call log including a list of originating phone numbers, the identification of the subscribers assigned to those phone numbers, the time and date of the calls, and the E-mail address of each subscriber assigned to those phone numbers that is contained within the call log and then delivers that information back through the wireless network to the requesting subscriber's wireless telephone. The SPN then terminates the connection.

The subscriber then uses buttons on the keypad to display the contents of the downloaded call log in the display on the cellular phone. The subscriber can then delete entries as desired either in whole or in part or can save in whole or in part selected entries directly to the phone book resident in the cellular telephone. Alternatively, the subscriber can select, by highlighting, one or more phone numbers and initiate phone calls. Since the cellular phone includes a mini-browser, the subscriber can also use the E-mail address to contact one or more of the entries on the call log.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A method for remotely polling a call log, the method comprising:
    establishing a connection between a subscriber and a service provider network, the service provider network having access to a database comprising a call log having information about phone calls placed to a subscriber across the service provider network, the information configured to indicate results of phone calls that were attempted but not connected, wherein the established connection between the subscriber and the service provider network is established with the subscriber using a device having a phone number different from the phone number to which the phone calls in the call log were placed;
    processing a request from the subscriber for a subscriber identified call log;
    obtaining a portion of the subscriber identified call log, the obtained portion containing non-personal and non-proprietary information;
    delivering the portion of the subscriber identified call log to the subscriber; and
    erasing, in response to delivering the portion of the call log, the subscriber identified call log at a predetermined time relative to delivering the portion of the subscriber identified call log to the subscriber.

2. The method of claim 1, wherein establishing the connection further comprises connecting to the service provider network using a wireless communication device connected to a wireless network, the wireless network in communication with the service provider network.

3. The method of claim 1, wherein establishing a connection further comprises connecting to the service provider network through a computer network that is in communication with the service provider network.

4. The method of claim 1, wherein processing the request from the subscriber further comprises:
    receiving the request from the subscriber;
    obtaining information regarding the subscriber requesting the call log; and
    verifying the availability of the requested call logs and access to the requested call logs by the subscriber.

5. The method of claim 4, wherein obtaining information comprises obtaining profile information about the subscriber.

6. The method of claim 4, wherein verifying availability and access comprises:
    verifying a valid subscription for access to the call log by the subscriber; and
    requesting verification information from the subscriber.

7. The method of claim 4, further comprising notifying the subscriber concerning the availability of the requested call logs.

8. The method of claim 4, further comprising:
    obtaining information on the location of each requested call log; and
    accessing each requested call log.

9. The method of claim 8, wherein information on the location comprises a computer readable address of a database containing the requested call log.

10. The method of claim 9, further comprising deleting selected entries from the delivered phone logs.

11. The method of claim 9, further comprising ignoring selected entries from the delivered phone logs.

12. The method of claim 9, further comprising saving selected entries from the delivered phone logs.

13. The method of claim 9, further comprising placing phone calls to selected entries from the delivered phone logs.

14. The method of claim 1, wherein the service provider network has access to a plurality of databases comprising a plurality of call logs.

15. The method of claim 1, further comprising terminating the connection between the subscriber and the service provider network in response to the subscriber receiving the obtained portions.

16. The method of claim 1, wherein the predetermined time is immediately after delivering the portion of the subscriber identified call log to the subscriber.

17. The method of claim 1, wherein the predetermined time is a time period after delivering the portion of the subscriber identified call log to the subscriber.

18. A method for remotely polling a call log, the method comprising:
    establishing a connection between a subscriber and a service provider network, the service provider network having access to a plurality of databases comprising call logs comprising information about phone calls placed to subscribers across the service provider network, the information configured to indicate results of phone calls that were attempted but not connected, wherein the established connection between the subscriber and the service provider network is established with the subscriber using a device having a phone number different from the phone number to which the phone calls in the call log were placed;
    receiving a request from the subscriber or one or more subscriber identified call logs;
    verifying the availability of the requested call logs and access to the requested call logs by the subscriber;
    obtaining a portion of each identified call log, the obtained portion containing non-personal and non-proprietary information;
    delivering the obtained portions to the subscriber; and
    erasing, in response to delivering the portion of the call log, the subscriber identified call log at a predetermined time relative to delivering the portion of the subscriber identified call log to the subscriber.

19. The method of claim 18, further comprising terminating the connection between the subscriber and the service provider network in response to the subscriber receiving the obtained portions.

20. A method for remotely polling a call log, the method comprising:
    establishing a connection between a subscriber and a service provider network, the service provider network having access to a database comprising a call log having information about phone calls placed to a subscriber across the service provider network, the information configured to indicate results of phone calls that were attempted but not connected, wherein the established connection between the subscriber and the service provider network is established with the subscriber using a device having a phone number different from the phone number to which the phone calls in the call log were placed;

processing a request from the subscriber for a subscriber identified call log wherein processing the request from the subscriber further comprises;
   receiving the request from the subscriber,
   obtaining information regarding the subscriber requesting the call log, and
   verifying the availability of the requested call logs and access to the requested call logs by the subscriber;
obtaining a portion of the subscriber identified call log, the obtained portion containing non-personal and non-proprietary information;
delivering the portion of the subscriber identified call log to the subscriber;
erasing, in response to delivering the portion of the call log, the subscriber identified call log at a predetermined time relative to delivering the portion of the subscriber identified call log to the subscriber;
obtaining information on the location of each requested call log wherein information on the location comprises a computer readable address of a database containing the requested call log;
accessing each requested call log; and
saving selected entries from the delivered phone logs.

* * * * *